(12) United States Patent
Lee et al.

(10) Patent No.: US 8,990,046 B2
(45) Date of Patent: Mar. 24, 2015

(54) METHOD AND PORTABLE TERMINAL FOR ESTIMATING STEP LENGTH OF PEDESTRIAN

(75) Inventors: Jae-Myeon Lee, Yongin-si (KR); Chan-Gook Park, Seoul (KR); Hyun-Su Hong, Seongnam-si (KR); Seung-Hyuck Shin, Seoul (KR); Min-Su Lee, Seoul (KR); Sun-Young Park, Suwon-si (KR)

(73) Assignees: Samsung Electronics Co., Ltd., Suwon-Si (KR); Seoul National University R&DB Foundation, Seoul (KR)

( * ) Notice: Subject to any disclaimer, the term of this patent is extended or adjusted under 35 U.S.C. 154(b) by 721 days.

(21) Appl. No.: 13/180,333

(22) Filed: Jul. 11, 2011

(65) Prior Publication Data

US 2012/0006112 A1   Jan. 12, 2012

(30) Foreign Application Priority Data

Jul. 9, 2010 (KR) ........................ 10-2010-0066296

(51) Int. Cl.
*G01C 22/00*   (2006.01)

(52) U.S. Cl.
CPC ................................... *G01C 22/006* (2013.01)
USPC ...................................................... 702/160

(58) Field of Classification Search
CPC ........................................................ G01C 22/006
USPC ........................................................ 702/160
See application file for complete search history.

(56) References Cited

U.S. PATENT DOCUMENTS

| 2006/0184320 | A1 | 8/2006 | Hong |
| 2007/0067094 | A1 | 3/2007 | Park et al. |
| 2007/0208532 | A1 | 9/2007 | Park et al. |
| 2008/0105065 | A1 | 5/2008 | Lee et al. |

(Continued)

FOREIGN PATENT DOCUMENTS

| CN | 1818559 | 8/2006 |
| CN | 1932524 | 3/2007 |
| JP | 09-152355 | 6/1997 |

(Continued)

OTHER PUBLICATIONS

International Search Report dated Feb. 20, 2012 in connection with International Patent Application No. PCT/KR2011/005069.

(Continued)

*Primary Examiner* — Janet Suglo (57) ABSTRACT

A method and apparatus of a portable terminal estimate a step length of a pedestrian. An accelerometer detects acceleration caused by a movement of the portable terminal as a pedestrian carrying the portable terminal walks. A gyroscope detects angular velocity caused by the movement of the portable terminal as the pedestrian walks. A controller determines a magnitude of a swinging motion of the portable terminal by using at least one of the detected acceleration and angular velocity, determines that the portable terminal makes the swinging motion when the magnitude of the swinging motion is equal to or greater than a predetermined value, determines a carrying position of the portable terminal in the pedestrian's body by using at least one of the detected acceleration and angular velocity, and estimates a step length of the pedestrian according to the determined carrying position of the portable terminal.

20 Claims, 5 Drawing Sheets

(56) References Cited

U.S. PATENT DOCUMENTS

2008/0120062 A1 5/2008 Lee et al.
2008/0172203 A1* 7/2008 Jorgensen .................... 702/160

FOREIGN PATENT DOCUMENTS

| JP | 2001-272247 | 10/2001 |
| JP | 2002-312754 | 10/2002 |
| JP | 2008-220653 | 8/2006 |
| JP | 2007-041143 | 2/2007 |
| JP | 2010-078492 | 4/2010 |
| KR | 1020060090913 A | 8/2006 |
| KR | 100682057 B1 | 2/2007 |
| KR | 100703292 B1 | 3/2007 |
| KR | 100800874 B1 | 1/2008 |

OTHER PUBLICATIONS

Japanese Notification of Reason for Rejection dated Jan. 7, 2014 in connection with Japanese Application No. 2013-518285, 9 pages.
Chinese Office Action dated Feb. 25, 2014 in connection wtih Chinese Application No. 201180034069.0, 21 pages.

* cited by examiner

METHOD AND PORTABLE TERMINAL FOR ESTIMATING STEP LENGTH OF PEDESTRIAN

CROSS-REFERENCE TO RELATED APPLICATION(S) AND CLAIM OF PRIORITY

The present application is related to and claims priority to application entitled "Method and Portable Terminal for Estimating Step Length of Pedestrian" filed in the Korean Industrial Property Office on Jul. 9, 2010, and assigned Serial No. 10-2010-0066296, the contents of which are hereby incorporated by reference.

TECHNICAL FIELD OF THE INVENTION

The present invention relates to a portable terminal, and more particularly to a method and portable terminal for estimating the step length of a pedestrian.

BACKGROUND OF THE INVENTION

In recent years, personal navigation systems capable of pedestrian-centric route guidance have been widely equipped in portable terminals, such as cellular phones, smart phones, PDAs and MP3 players. The personal navigation system refers to a system that detects the location of a pedestrian to be guided by the system and guides a route for the pedestrian by using the detected location of the pedestrian.

A personal navigation system for pedestrian navigation may be implemented by equipping a portable terminal with a GPS receiver, an accelerometer, a gyroscope, and such. This personal navigation system estimates the step length of a pedestrian and produces a navigation solution by using the estimated step length to thereby provide a navigation service. Thus, in order to provide an accurate navigation service, the step length of a pedestrian should be accurately measured.

In the prior art, the step length of a pedestrian is estimated without considering in which body part the pedestrian carries a portable terminal during his/her movement. In the process of estimating the step length in this manner, a considerable error may occur depending on the position of the portable terminal carried by the pedestrian in different body parts which, in the worst case scenario, may result in a large deterioration in step length estimation performance.

SUMMARY OF THE INVENTION

To address the above-discussed deficiencies of the prior art, it is a primary object to provide a method and apparatus for estimating a step length, which can provide a more accurate route for a pedestrian by determining the carrying position of the portable terminal in the pedestrian's body by using an accelerometer and a gyroscope and applying a different step length estimation algorithm depending on the determined carrying position of the portable terminal.

In accordance with an aspect of the present invention, there is provided a portable terminal including an accelerometer, a gyroscope, and a controller. The accelerometer detects acceleration due to a movement of the portable terminal as a pedestrian carrying the portable terminal walks. The gyroscope detects angular velocity due to the movement of the portable terminal as the pedestrian walks. And the controller determines a magnitude of a swinging motion of the portable terminal by using at least one of the detected acceleration and angular velocity, determines that the portable terminal makes the swinging motion when the magnitude of the swinging motion is equal to or greater than a predetermined value, determines a carrying position of the portable terminal in the pedestrian's body by using at least one of the detected acceleration and angular velocity, and estimates a step length of the pedestrian according to the determined carrying position of the portable terminal.

In accordance with another aspect of the present invention, there is provided a step length estimation method. As a pedestrian carrying a portable terminal walks, acceleration due to a movement of the portable terminal is detected by using an accelerometer embedded in the portable terminal. As the pedestrian carrying the portable terminal walks, angular velocity due to the movement of the portable terminal is detected by using a gyroscope embedded in the portable terminal. A magnitude of a swinging motion of the portable terminal is determined by using at least one of the detected acceleration and angular velocity. When the magnitude of the swinging motion is equal to or greater than a predetermined value, the portable terminal is determined to be making the swinging motion. A carrying position of the portable terminal is determined by using at least one of the detected acceleration and angular velocity. And the step length of the pedestrian is estimated according to the determined carrying position of the portable terminal.

According to yet another aspect of the present invention, a portable terminal is provided. The portable terminal includes an accelerometer, a gyroscope, and a controller. The accelerometer detects acceleration due to a movement of the portable terminal. The gyroscope detects direction information for the movement of the portable terminal. And the controller determines a magnitude of a swinging motion of the portable terminal by using the detected acceleration and direction information, and applies a corresponding pedestrian step length estimation algorithm according to the magnitude of the swinging motion.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged portable terminal. In the following description, the same elements will be designated by the same reference numerals although they are shown in different drawings. Furthermore, various specific definitions found in the following description, such as specific values of packet identifications, contents of displayed information, and such, are provided only to help general understanding of the present invention, and it is apparent to those skilled in the art that the present invention can be implemented without such definitions. Furthermore, in the following description of the present invention, a detailed description of known functions and configurations incorporated herein will be omitted when it may obscure the subject matter of the present invention.

Figure 1A:
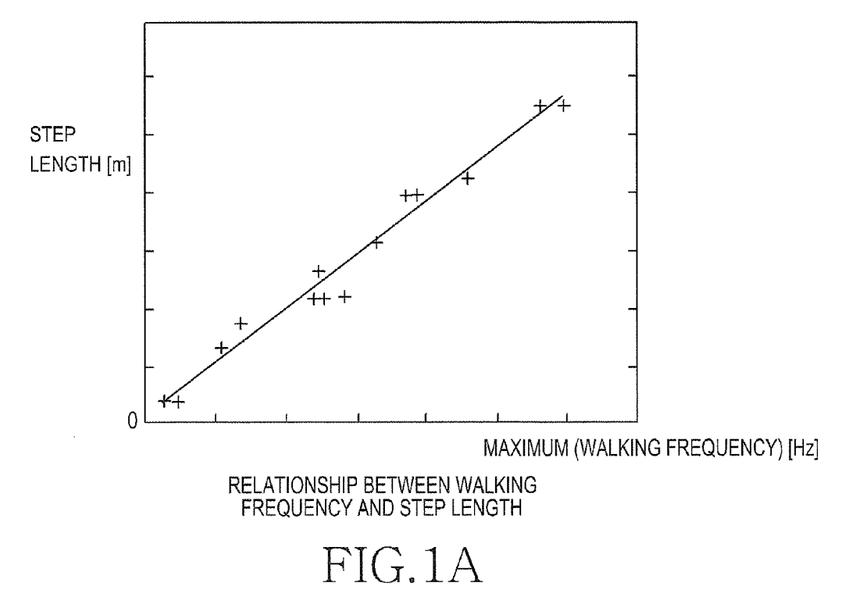
FIGS. 1A and 1B are graphs illustrating a relation between a walking frequency and a step length and a relation between an acceleration variance and a step length.
Figure 1B:
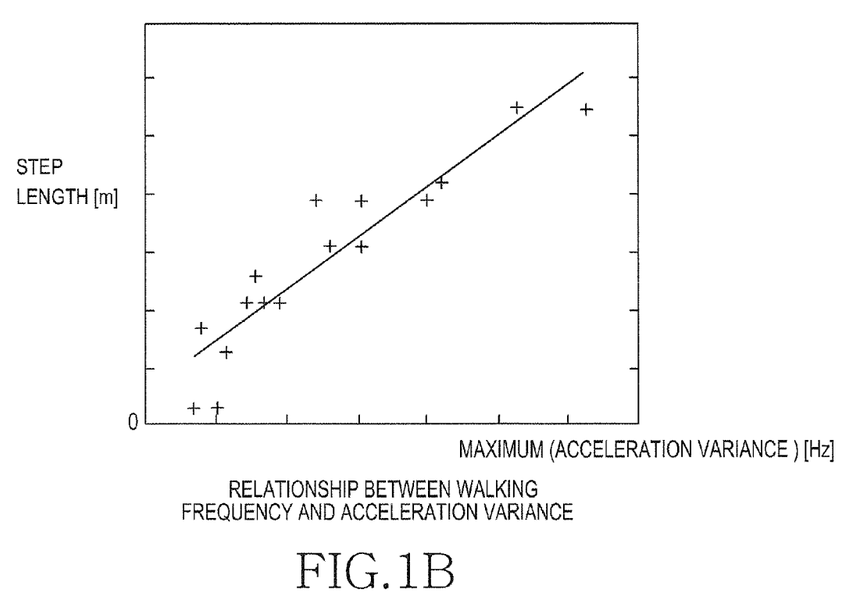

FIGS. 1A and 1B illustrate a relationship between a walking frequency and a step length and a relationship between an acceleration variance and a step length.

As shown in FIGS. 1A and 1B, walking frequency and acceleration variance serve as parameters used to calculate step length estimates that properly reflect the characteristics of a change in step length according to a step pattern. FIG. 1A is a graph illustrating a relationship between a step length and a walking frequency, and FIG. 1B is a graph illustrating a relationship between a step length and an acceleration variance. From the graphs of FIGS. 1A and 1B, it can be noted that the step length has a linear relation with each of the walking frequency and the acceleration variance. Accordingly, a step length can be represented by a linear combination of these two parameters, that is, a walking frequency and an acceleration variance, as given in the following equation:

$$\text{step length} = a_1 \cdot WF + a_2 \cdot AV + b \quad \text{[Eqn. 1]}$$

In Equation 1, $a_1$ is a weight of a walking frequency, $a_2$ is a weight of an acceleration variance respectively, b is a constant term, WF is a walking frequency, and AV is an acceleration variance.

Therefore, since a walking frequency and the variance value of an accelerometer output at the moment when a pedestrian takes each step can be calculated, the total walking distance can be calculated by summating step lengths of respective steps after the pedestrian takes several steps, as given in the following equation:

$$\text{walking distance} = \sum_{i=1}^{n} (a_1 \cdot WF_i + a_2 \cdot AV_i + b) \quad \text{[Eqn. 2]}$$

In Equation 2, n is the number of detected steps, and coefficients $a_1$, $a_2$, and b are weights of respective parameters in a linear combination of a walking frequency and an acceleration variance, which are calculated by a linear regression. The step length estimation parameter coefficients are obtained by modeling a relation between the step length and the walking frequency and a relation between the step length and the acceleration variance.

Reference will now be made to a process and apparatus for estimating a step length as given in Equation 1, that is, a process setting parameter coefficients $a_1$, $a_2$, and b.

Figure 2:
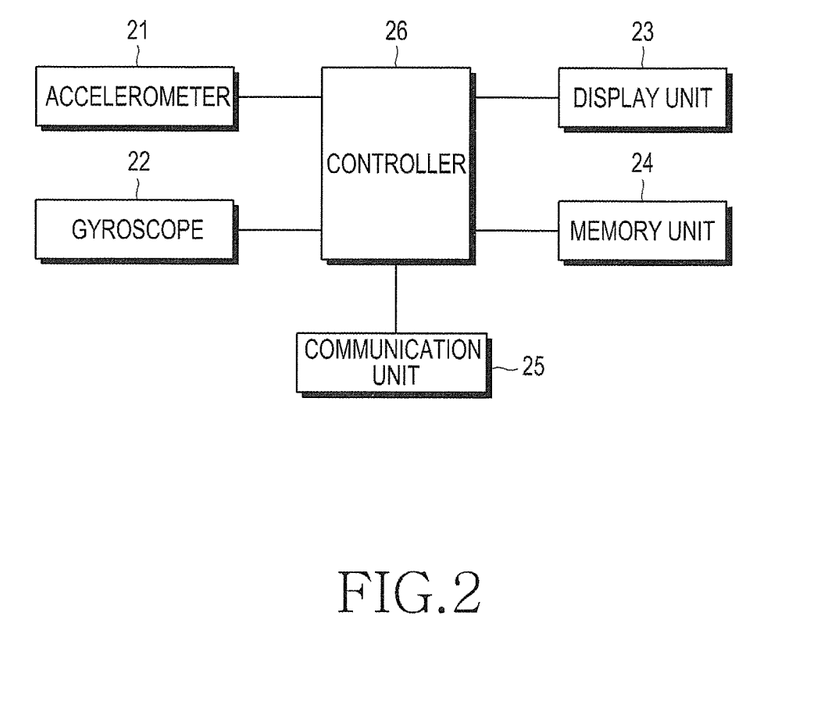
FIG. 2 is a block diagram of a portable terminal in accordance with an embodiment of the present invention.

FIG. 2 illustrates a portable terminal according to an embodiment of the present invention.

Referring to FIG. 2, the portable terminal according to this embodiment includes an accelerometer 21, a gyroscope 22, and a controller 26. As shown in FIG. 2, the portable terminal may further include a display unit 23, a memory unit 24, and a communication unit 25.

More specially, the accelerometer 21 is a sensor that measures the acceleration of a portable terminal, such as a cellular phone, a smart phone, a PDA, or an MP3 player. In the portable terminal according to the present invention, the accelerometer 21 may be a MEMS (Micro Electro Mechanical System) type accelerometer, such as a subminiature accelerometer that can be embedded in the portable terminal. The accelerometer 21 may be designed such that it can detect the acceleration of the portable terminal on three axes. According to an embodiment of the present invention, the accelerometer 21 may be implemented using a 3-axis accelerometer or three 1-axis accelerometers.

The accelerometer 21 is mounted in the portable terminal in such a manner that the three axes are oriented in a lateral direction (right or left direction), a forward direction, and a downward direction (e.g. x, y, and z axes on a Cartesian coordinate system). Of course, it is preferred that each axis of the accelerometer 21 is correctly oriented. However, because the acceleration components due to walking are more important than directions in the present invention, the accelerometer 21 can maintain its characteristics even when each axis slightly deviates from each direction within a range that does not affect the acceleration signal detection. Also, even when the accelerometer 21 is much distorted in attitude (e.g. orientation), an attitude angle can be estimated by an accelerometer average. Thus, the accelerometer 21 can always measure acceleration components in the lateral, forward, and downward directions. The accelerometer 21 detects linear movements in the lateral, forward, and downward directions, and outputs an acceleration signal corresponding to each detection result.

The gyroscope 22 is a sensor that measures a rotation direction with respect to a reference direction. That is, when a reference direction is set to 0 degree direction, the gyroscope 22 measures how many degrees a current direction is rotated from the reference direction. The gyroscope 22 is also a subminiature sensor, such as a MEMS type gyroscope, which can be embedded in the portable terminal. The gyroscope 22 is so designed that it can detect the angular velocity of the portable terminal on three axes.

The moving path of an object can be expressed using both the accelerometer 21 and the gyroscope 22. The position of a starting point is determined first, and then a current direction is measured using the gyroscope 22. Next, an acceleration value is measured using the accelerometer 21, and a distance is calculated by integrating the measured acceleration value twice. In this way, it is possible to determine a current position by using the distance and direction from the starting point. Alternatively, it is also possible to determine a current position by estimating a moving direction by means of a geomagnetometer and estimating a moving distance through a step length estimation algorithm based on walking detection derived from the accelerometer 21.

The display unit 23 displays general driving states of the portable terminal, and may display the carrying position of the portable terminal, which is determined according to the present invention. The display unit 23 may include a liquid crystal display (LCD), an organic light emitting diode (OLED), and such.

The memory unit 24 may store common programs and applications for driving the portable terminal. Furthermore, the memory unit 24 may store a step length estimation algorithm and such according to an embodiment of the present invention.

The communication unit 25 is responsible for transmission and reception of voice data, text data, image data, and control data. To this end, the communication unit 24 includes an RF transmitter for up-converting and amplifying the frequency of a transmitted signal, an RF receiver for low-noise amplifying and down-converting a received signal, an antenna for transmitting and receiving a signal, and so forth. Using the communication unit 25, the carrying position of the portable terminal or an estimated step length may be stored in the memory unit embedded in the portable terminal or in an external memory unit.

The controller 26 controls the accelerometer 21, the gyroscope 22, the display unit 23, the memory unit 24, and the communication unit 25 in order to drive the portable terminal. According to an embodiment of the present invention, the controller 26 determines the magnitude of the swinging motion of the portable terminal by using acceleration detected by the accelerometer 21 or angular velocity detected by the gyroscope 22. Subsequently, the controller 26 compares the magnitude of the swinging motion with a predetermined value to thereby determine whether the portable terminal makes a swinging motion, and based on the result of this determination, determines in which body part a pedestrian carries the portable terminal.

FIGS. 3A-3B and 4A-4B illustrate four carrying positions of a portable terminal under consideration in the present invention.

Figure 3A:
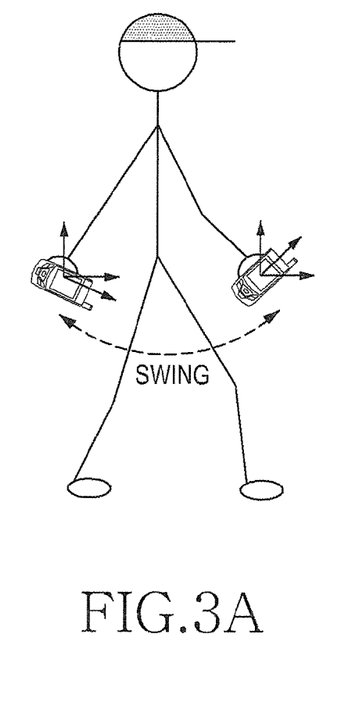
FIGS. 3A-3B and 4A-4B are views of four possible carrying positions of a portable terminal under consideration in the present invention.
Figure 3B:
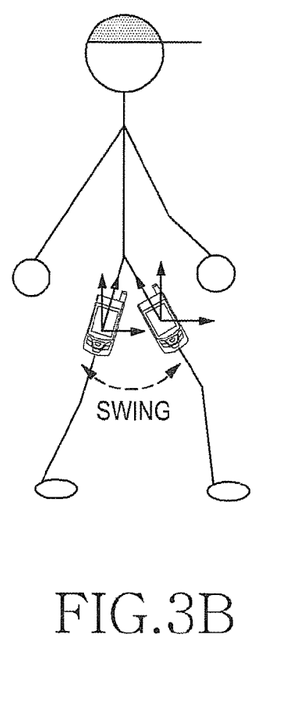
Figure 4A:
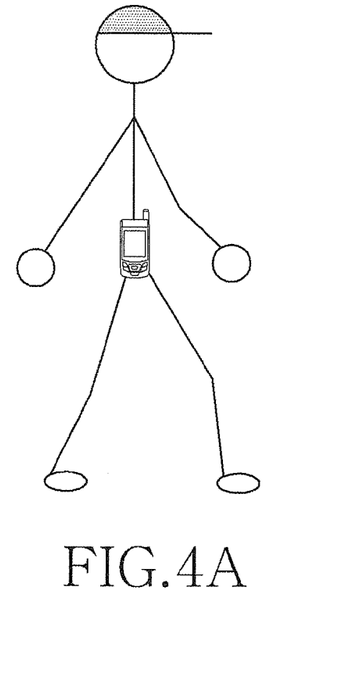
Figure 4B:
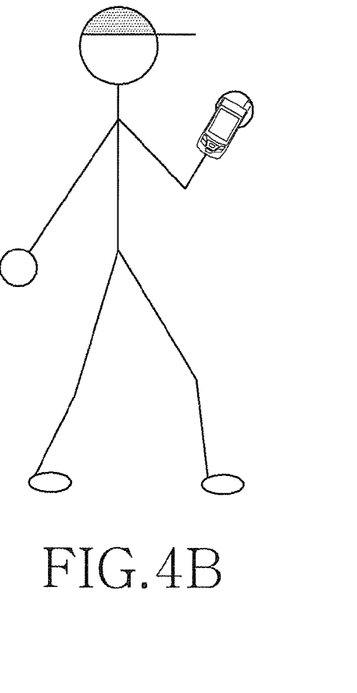

As shown in FIGS. 3A-3B and 4A-4B, carrying positions of a portable terminal under consideration in the present invention are broadly grouped in two categories according to whether or not the portable terminal swings. The first category is when a portable terminal swings as shown in FIGS. 3A and 3B, and the second category is when the swinging motion of a portable terminal is slight, that is, a portable terminal does not swing as shown in FIGS. 4A and 4B.

In FIGS. 3A and 3B, the category corresponding to when a portable terminal swings is in turn divided into a situation in which a portable terminal held in a pedestrian's hand swings (FIG. 3A) and a situation in which a portable terminal carried in a pedestrian's pocket swings (FIG. 3B). Also, in FIGS. 4A and 4B, the category in which a portable terminal does not swing is in turn divided into a situation in which a portable terminal is carried on a pedestrian's waist (FIG. 4A) and a situation in which a portable terminal is held in a pedestrian's hand without a swinging motion (FIG. 4B).

A normal way for a pedestrian to carry a portable terminal is largely divided into the above four types of situations, and any carrying position may be included in one of the four situations, based on the magnitude of a swinging motion and such. For example, when a portable terminal is carried in a pedestrian's handbag, the carrying position of the portable terminal may be included in the category in which the portable terminal held in the pedestrian's hand swings or the category in which the portable terminal is carried on the pedestrian's waist, according to whether or not the handbag makes a swinging motion.

Of the above four types of situations, the former two situations (FIGS. 3A and 3B), that is, the situation in which a portable terminal held in a pedestrian's hand swings (FIG. 3A) and the situation in which a portable terminal carried in a pedestrian's pocket swings (FIG. 3B), correspond to the category in which a swinging motion is applied to the portable terminal as the pedestrian walks. In contrast, the latter two situations (FIGS. 4A and 4B), that is, the situation a portable terminal is carried on a pedestrian's waist (FIG. 4A) and the situation in which a portable terminal is held in a pedestrian's hand without a swinging motion (FIG. 4B), correspond to the category in which although the pedestrian walks, a very weak swinging motion or no swinging motion is applied to the portable terminal.

Whether or not a portable terminal swings is identified by the magnitude of a swinging motion. Using acceleration and angular velocity detected by the accelerometer 21 and the gyroscope 22, the magnitude of a swinging motion is derived from the magnitude of acceleration, a pitch variation, or a combination thereof. The magnitude of acceleration and the pitch variation are calculated by the following equations:

$$\text{magnitude of acceleration } (A) = \sqrt{A_x^2 + A_y^2 + A_z^2} \quad \text{[Eqn. 3]}$$

$$\text{pitch variation } (\Delta\text{pitch}) = \text{pitch}_{max} - \text{pitch}_{min} \quad \text{[Eqn. 4]}$$

If the magnitude of acceleration or the pitch variation is equal to or greater than a predetermined value of a corresponding threshold, then a portable terminal is determined to make a swinging motion. Otherwise, the portable terminal is determined not to make a swinging motion. Also, when the magnitude of acceleration and the pitch variation are used at the same time, their weights are set according to values preset for the magnitude of acceleration and the pitch variation respectively. If a sum of the set weights is equal to or greater than a predetermined value, then a portable terminal is determined to make a swinging motion. Otherwise, the portable terminal is determined not to make a swinging motion.

When as a result of the above determination procedure, a portable terminal is determined to make a swinging motion, whether the portable terminal is held in a pedestrian's swinging hand or is carried in the pedestrian's pocket is determined using the magnitude of horizontal acceleration, the pitch variation, or a combination thereof. The magnitude of horizontal acceleration is expressed as the resultant magnitude of acceleration in the north direction and acceleration in the east direction with respect to a horizontal plane parallel to the ground, and is calculated by the following equation:

$$\text{magnitude of horizontal acceleration } (F) = \sqrt{F_n^2 + F_e^2} \quad \text{[Eqn. 5]}$$

If the magnitude of horizontal acceleration or the pitch variation is equal to or greater than a predetermined value of a corresponding threshold, then a portable terminal is determined to be held in a pedestrian's swinging hand. Otherwise, the portable terminal is determined to be carried in the pedestrian's pocket. Also, when the magnitude of horizontal acceleration and the pitch variation are used at the same time, their weights are set according to values preset for the magnitude of horizontal acceleration and the pitch variation, respectively. If a sum of the set weights is equal to or greater than a predetermined value, then a portable terminal is determined to be held in a pedestrian's swinging hand. Otherwise, the portable terminal is determined to be carried in the pedestrian's pocket.

When as a result of the above procedure of determining whether a portable terminal swings, the portable terminal is determined not to make a swinging motion, whether the portable terminal is held in a pedestrian's non-swinging hand (fixed hand) or is carried on the pedestrian's waist is determined using the magnitude of angular velocity, the variance of the magnitude of yaw rate, the variance of yaw, or a combination thereof. The magnitude of angular velocity, the variance of the magnitude of yaw rate, and the variance of yaw are calculated by the following equations:

$$\text{magnitude of angular rate}(W) = \sqrt{W_x^2 + W_y^2 + W_z^2} \quad [\text{Eqn. 6}]$$

$$\text{variance of magnitude of yaw rate} = \frac{1}{N-1}\sum_{i=1}^{N}(W_{z\_i} - \overline{W})^2 \quad [\text{Eqn. 7}]$$

$$\text{variance of yaw} = \frac{1}{N-1}\sum_{i=1}^{N}(\psi_i - \overline{\psi})^2 \quad [\text{Eqn. 8}]$$

If the magnitude of angular velocity, the variance of the magnitude of yaw rate, or the variance of yaw is equal to or greater than a predetermined value of a corresponding threshold, then a portable terminal is determined to be carried on a pedestrian's waist. Otherwise, the portable terminal is determined to be held in the pedestrian's fixed hand. Also, when the magnitude of angular velocity, the variance of the magnitude of yaw rate, or the variance of yaw are used concurrently, their weights are set according to values preset for the magnitude of angular velocity, the variance of the magnitude of yaw rate, or the variance of yaw, respectively. If a sum of the set weights is equal to or greater than a predetermined value, then a portable terminal is determined to be carried on a pedestrian's waist. Otherwise, the portable terminal is determined to be held in the pedestrian's fixed hand.

The reason why a portable terminal is determined to be held in a pedestrian's fixed hand when the magnitude of angular velocity, the variance of the magnitude of yaw rate, or the variance of yaw is less than a predetermined value is that because an arm joint connecting a pedestrian's body and hand acts as a damper for the pedestrian's movement, the angular velocity of the portable terminal is smaller when held in the pedestrian's fixed hand than when carried on the pedestrian's waist.

After the carrying position of a portable terminal is identified, a step length is estimated by using Equation 1. A step length estimation algorithm for a pedestrian is applied in such a manner that the parameters ($a_1$, $a_2$, b) in Equation 1 are set to different values according to the above four types of carrying positions. For example, the values of the parameters according to the above four types of carrying positions are shown in Table 1.

TABLE 1

|  | $a_1$ | $a_2$ | b |
|---|---|---|---|
| hand (swinging) | 0.45 | 0.23 | 0.23 |
| trousers pocket | 0.51 | 0.65 | 0.19 |

TABLE 1-continued

|  | $a_1$ | $a_2$ | b |
|---|---|---|---|
| waist | 0.73 | 0.91 | 0.22 |
| hand (fixed) | 0.68 | 0.79 | 0.29 |

Using $a_1$, $a_2$, and b obtained from Table 1, a walking frequency (about 2 Hz), and an acceleration variance, the step length of a pedestrian can be estimated by using Equation 1.

Figure 5:
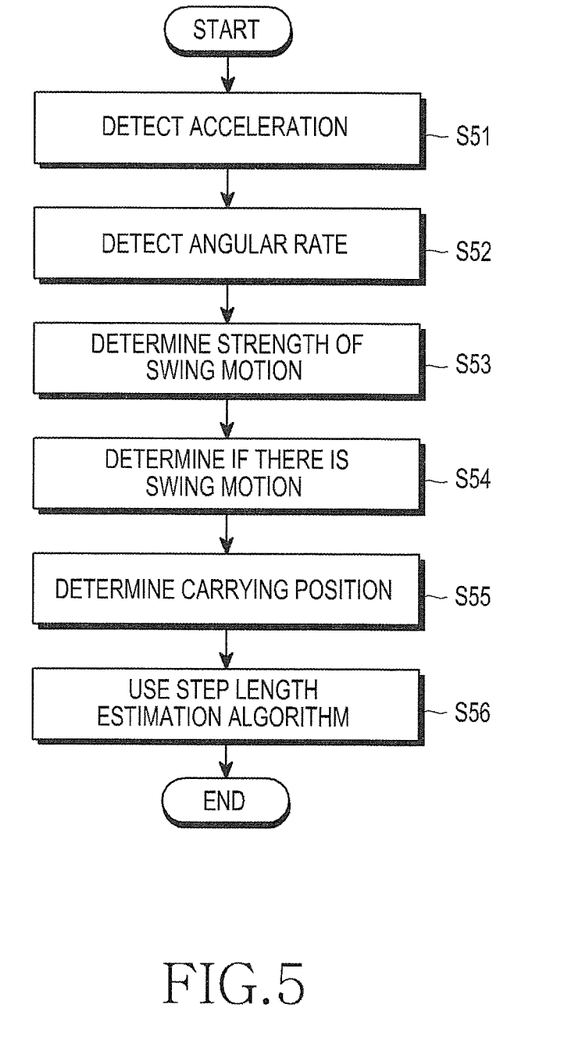
FIG. 5 illustrates a step length estimation process in accordance with an embodiment of the present invention.

FIG. 5 illustrates a step length estimation process according to an embodiment of the present invention.

As shown in FIG. 5, the step length estimation process according to this embodiment includes an acceleration detection operation (block S51), an angular velocity detection operation (block S52), determining the magnitude of a swinging motion (block S53), determining whether there is a swinging motion (block S54), determining the carrying position of a portable terminal (block S55), and using a step length estimation algorithm (block S56).

In the acceleration detection operation (block S51), as a pedestrian carries a portable terminal, acceleration due to a movement of the portable terminal is detected using an accelerometer embedded in the portable terminal. Here, the accelerometer may be a MEMS type accelerometer that is small enough to be embedded in the portable terminal.

In the angular velocity detection operation (block S52), as the pedestrian carrying the portable terminal walks, angular velocity due to the movement of the portable terminal is detected using a gyroscope embedded in the portable terminal. Here, the gyroscope measures angular velocity in three axis directions and may also be a MEMS type gyroscope that is small enough to be embedded in the portable terminal.

When determining the magnitude of a swinging motion (block S53), the magnitude of the swinging motion of the portable terminal is determined using at least one of the detected acceleration and angular velocity. The magnitude of the swinging motion is derived from the magnitude of acceleration, a pitch variation, or a combination thereof. In particular, according to an embodiment of the present invention, the magnitude of the swinging motion may be derived from a combination of the magnitude of acceleration and the pitch variation. In this situation, weights of the magnitude of acceleration and the pitch variation are set respectively, and the magnitude of the swinging motion is determined by a sum of the set weights.

When determining whether there is a swinging motion (block S54), whether or not the portable terminal makes a swinging motion is determined by comparing the determined magnitude of the swinging motion with a predetermined value ($\alpha 1$ or $\alpha 2$). That is, if the magnitude of the swinging motion is equal to or greater than a predetermined value ($\alpha 1$ or $\alpha 2$), then the portable terminal is determined to make a swinging motion. Otherwise, the portable terminal is determined not to make a swinging motion.

When determining the carrying position of a portable terminal (block S55), the position of the pedestrian's body part in which the pedestrian carries the portable terminal is determined using at least one of the detected acceleration and angular velocity.

According to an embodiment of the present invention, when the portable terminal is determined in block S54 to make a swinging motion, the step length estimation method further includes determining the magnitude of horizontal acceleration according to the swinging motion of the portable terminal and comparing the magnitude of horizontal acceleration with a predetermined value ($\beta 1$). If the magnitude of horizontal acceleration is equal to or greater than the predetermined value (β1), then the portable terminal is determined to make a swinging motion while being held in the pedestrian's hand. In contrast, if the magnitude of horizontal acceleration is less than the predetermined value (β1), then the portable terminal is determined to make a swinging motion while being carried in the pedestrian's pocket.

According to an embodiment of the present invention, when the portable terminal is determined in block S54 to make a swinging motion, the step length estimation method further includes determining the pitch variation according to the swinging motion of the portable terminal and comparing the pitch variation with a predetermined value (β2). If the pitch variation is equal to or greater than the predetermined value (β2), then the portable terminal is determined to make a swinging motion while being held in the pedestrian's hand. In contrast, if the pitch variation is less than the predetermined value (β2), then the portable terminal is determined to make a swinging motion while being carried in the pedestrian's pocket.

According to another embodiment of the present invention, when the portable terminal is determined in block S54 to make a swinging motion, the step length estimation method further includes determining the magnitude of horizontal acceleration and the pitch variation according to the swinging motion of the portable terminal, setting weights of the magnitude of horizontal acceleration and the pitch variation, respectively, and comparing a sum of the weights with a predetermined value. If the sum of the weights is equal to or greater than the predetermined value, then the portable terminal is determined to make a swinging motion while being held in the pedestrian's hand. In contrast, if the sum of the weights is less than the predetermined value, then the portable terminal is determined to make a swinging motion while being carried in the pedestrian's pocket.

According to an embodiment of the present invention, when the portable terminal is determined in block S54 not to make a swinging motion, the step length estimation process further includes determining the magnitude of the angular velocity of the portable terminal and comparing the magnitude of the angular velocity of the portable terminal with a predetermined value (γ1). If the magnitude of the angular velocity of the portable terminal is equal to or greater than the predetermined value (γ1), then the portable terminal is determined to be carried on the pedestrian's waist. In contrast, if the magnitude of the angular velocity of the portable terminal is less than the predetermined value (γ1), then the portable terminal is determined to be held in the pedestrian's hand without a swinging motion.

According to an embodiment of the present invention, when the portable terminal is determined in block S54 not to make a swinging motion, the step length estimation process further includes determining the variance of the magnitude of the yaw rate of the portable terminal and comparing the variance of the magnitude of the yaw rate of the portable terminal with a predetermined value (γ2). If the variance of the magnitude of the yaw rate of the portable terminal is equal to or greater than the predetermined value (γ2), then the portable terminal is determined to be carried on the pedestrian's waist. In contrast, if the variance of the magnitude of the yaw rate of the portable terminal is less than the predetermined value (γ2), then the portable terminal is determined to be held in the pedestrian's hand without a swinging motion.

According to another embodiment of the present invention, when the portable terminal is determined in block S54 not to make a swinging motion, the step length estimation process further includes determining the variance of the yaw of the portable terminal and comparing the variance of the yaw of the portable terminal with a predetermined value (γ3). If the variance of the yaw of the portable terminal is equal to or greater than the predetermined value (γ3), then the portable terminal is determined to be carried on the pedestrian's waist. In contrast, if the variance of the yaw of the portable terminal is less than the predetermined value (γ3), then the portable terminal is determined to be held in the pedestrian's hand without a swinging motion.

According to yet another embodiment of the present invention, when the portable terminal is determined in block S54 not to make a swinging motion, the step length estimation process further includes determining the magnitude of the angular velocity, the variance of the magnitude of the yaw rate, and the variance of the yaw of the portable terminal, setting weights of the magnitude of the angular velocity, the variance of the magnitude of the yaw rate, and the variance of the yaw of the portable terminal, respectively, and comparing a sum of the weights with a predetermined value. If the sum of the weights is equal to or greater than the predetermined value, then the portable terminal is determined to be carried on the pedestrian's waist. In contrast, if the sum of the weights is less than the predetermined value, then the portable terminal is determined to be held in the pedestrian's hand without a swinging motion.

When using a step length estimation algorithm (S56), the step length of the pedestrian is estimated differently depending on the carrying position of the portable terminal. That is, the step length of the pedestrian is estimated by applying optimal parameters ($a_1$, $a_2$, and b in Equations (1) and (2)) for each of the four carrying positions of the portable terminal. The optimal parameters may be experimentally obtained in advance, or may also be obtained through learning of the portable terminal.

Figure 6:
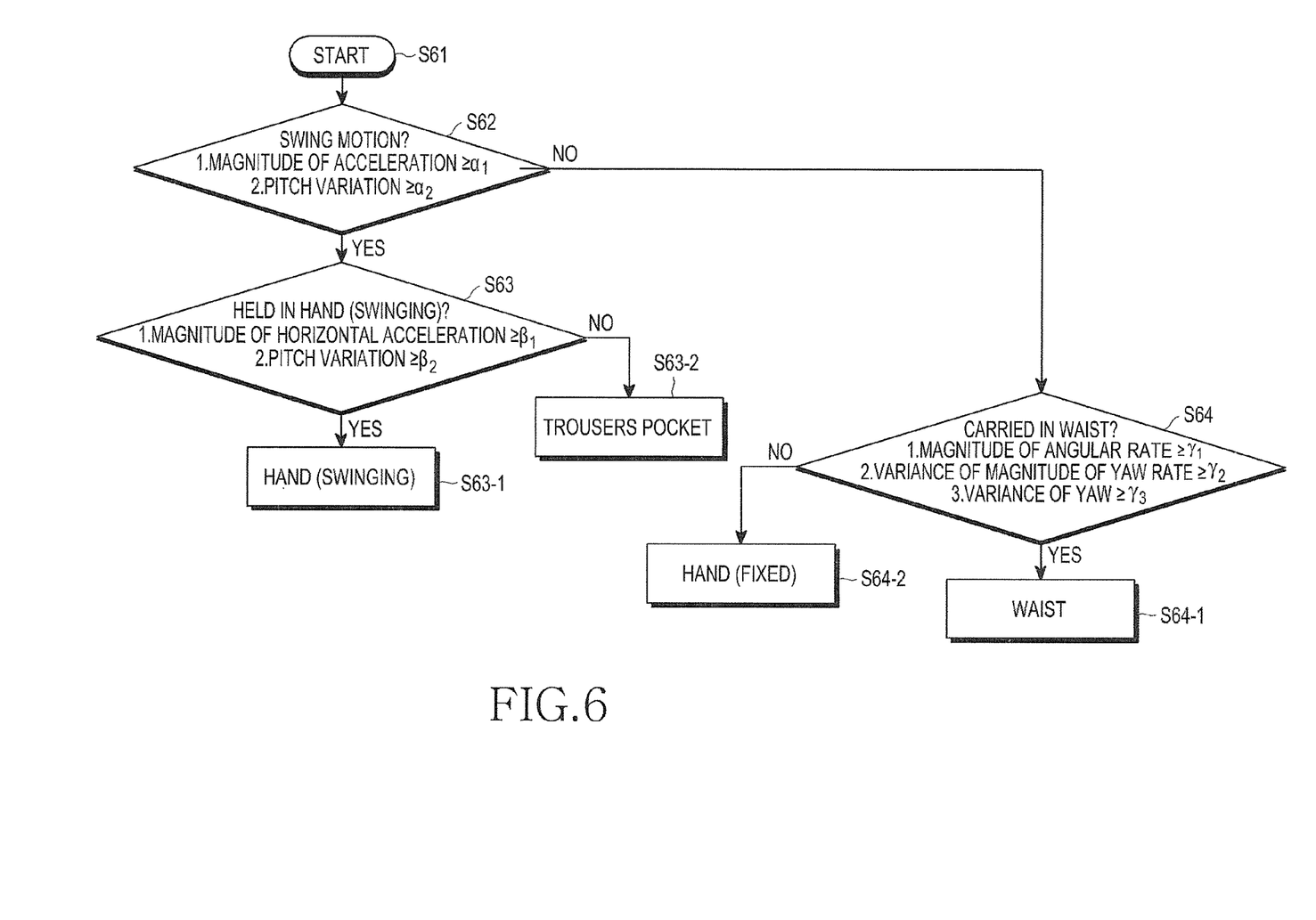
FIG. 6 illustrates a process of determining the carrying position in accordance with an embodiment of the present invention.

FIG. 6 illustrates process for determining the carrying position according to an embodiment of the present invention.

One example of a process for estimating the step length of a pedestrian will be given through FIG. 6. When a signal for step length estimation is input, first of all, it is necessary to determine whether a portable terminal swings. Acceleration detected by an accelerometer of the portable terminal may be used to determine whether the portable terminal swings. The magnitude of acceleration is derived from acceleration components in three axis directions, and then the derived magnitude of acceleration is compared with a predetermined value α1. If the magnitude of acceleration is equal to or greater than α1, then the portable terminal is determined to make a swinging motion. Alternatively, it is also possible to obtain the pitch variation and then compare the obtained pitch variation with another predetermined value α2. Similarly, if the pitch variation is equal to or greater than α2, then the portable terminal is determined to make a swinging motion.

After the portable terminal is determined to make a swinging motion, whether the portable terminal makes a swinging motion while being held in the pedestrian's hand or carried in the pedestrian's pocket is determined. The magnitude of horizontal acceleration, the pitch variation, or a combination thereof may be used for this determination. When the magnitude of horizontal acceleration is equal to or greater than a predetermined value β1, the portable terminal is determined to make a swinging motion while being held in the pedestrian's hand. Furthermore, when the pitch variation is equal to or greater than a predetermined value β2, the portable terminal is also determined to make a swinging motion while being held in the pedestrian's hand.

After the portable terminal is determined not to make a swinging motion, whether the portable terminal is carried on the pedestrian's waist or held in the pedestrian's non-swinging hand (for example, when the pedestrian talks over the portable terminal held in his/her hand) is determined. The magnitude of angular velocity, the variance of the magnitude of yaw rate, the variance of yaw, or a combination thereof may be used for this determination. When the magnitude of angular velocity is equal to or greater than a predetermined value γ1, the portable terminal is determined to be carried on the pedestrian's waist. Furthermore, when the variance of the magnitude of yaw rate is equal to or greater than a predetermined value γ2, the portable terminal is also determined to be carried on the pedestrian's waist. Furthermore, when the variance of yaw is equal to or greater than a predetermined value γ3, the portable terminal is determined to be carried on the pedestrian's waist.

In the method and portable terminal for estimating the step length of a pedestrian according to the present invention, a series of tests were conducted to verify the step length estimation algorithm, and the test results will be described hereinafter.

The test conditions were as follows: a pedestrian walked 50 m in a straight line, and this 50 m walk test was conducted with a portable terminal carried on the pedestrian's waist, held in the pedestrian's hand (fixed), carried in the pedestrian's pocket, and held in the pedestrian's hand (swinging) respectively. The pedestrian walked 50 m and then the result of recognizing the corresponding carrying position of the portable terminal was checked while the carrying position of the portable terminal was changed from the pedestrian's waist to the pedestrian's hand (swinging), the pedestrian's hand (fixed), and the pedestrian's pocket in that order. The same test was also conducted for three different pedestrians.

The result of recognizing the carrying position corresponding to the pedestrian's hand (fixed) is relatively better than the result of recognizing the carrying position corresponding to the pedestrian's waist. This is because since there are probably many occasions when a pedestrian holds a portable terminal in his/her hand (fixed) in an actual situation, the step length estimation algorithm has been established with the aim of minimizing an error rate for a pedestrian's hand (fixed).

TABLE 2

|  | waist | hand (fixed) | trousers pocket | hand (swinging) |
|---|---|---|---|---|
| error rate (%) | 3.5048 | 0.3854 | 1.5562 | 0.2973 |

Table 2 given above shows results obtained by applying the above algorithm for recognizing the carrying position of a portable terminal. Error rates for the four carrying positions substantially range from approximately 1 to 3%. The walking distance of a pedestrian can be more accurately estimated using the algorithm for recognizing the carrying position of a portable terminal to apply the step length estimation parameters ($a_1$, $a_2$, and b in Equations 1 and 2) suitable to each carrying position.

TABLE 3

|  | hand (fixed) | trousers pocket | hand (swinging) |
|---|---|---|---|
| error rate (%) | 5.92/27.11 | 3.60/14.03 | 6.49/14.35 |

Table 3 given above shows error rates in % for the worst case scenario of the prior art step length estimation and the worst scenario of the inventive step length estimation when the step length estimation algorithm is applied to each carrying position. Through the results of Table 3, it can be noted that the inventive step length estimation process has a significantly improved effect of estimating a step length.

As described above, the inventive portable terminal for estimating a step length can advantageously guide a more accurate route for a pedestrian by determining the carrying position of the portable terminal in the pedestrian's body by using an accelerometer and a gyroscope and applying a different step length estimation algorithm depending on the determined carrying position of the portable terminal.

Although the present disclosure has been described with embodiments, various changes and modifications may be suggested to one skilled in the art. It is intended that the present disclosure encompass such changes and modifications as fall within the scope of the appended claims.

What is claimed is:

1. A portable terminal comprising:
an accelerometer embedded in the portable terminal configured to detect acceleration due to a movement of the portable terminal as a pedestrian carrying the portable terminal walks;
a gyroscope embedded in the portable terminal configured to detect angular velocity due to the movement of the portable terminal as the pedestrian carrying the portable terminal walks; and
a controller configured to determine a magnitude of a swinging motion of the portable terminal by using at least one of the detected acceleration and angular velocity, determine that the portable terminal makes the swinging motion if the magnitude of the swinging motion is equal to or greater than a predetermined value, determine a carrying position of the portable terminal in or on the pedestrian's body by using at least one of the detected acceleration and angular velocity, and estimate a step length of the pedestrian according to the determined carrying position of the portable terminal.

2. The portable terminal as claimed in claim 1, wherein the controller is further configured to determine the magnitude of the swinging motion by using one of a magnitude of the acceleration, a pitch variation, and the magnitude of the acceleration and the pitch variation.

3. The portable terminal as claimed in claim 2, wherein the controller, when determining the magnitude of the swinging motion using the magnitude of the acceleration and the pitch variation, is further configured to set weights of the magnitude of the acceleration and the pitch variation according to values preset for the magnitude of the acceleration and the pitch variation, respectively, and determine the magnitude of the swinging motion by a sum of the weights.

4. The portable terminal as claimed in claim 1, wherein the controller, when determining that the portable terminal makes the swinging motion, is further configured to determine a magnitude of horizontal acceleration according to the swinging motion of the portable terminal, determine that the portable terminal makes the swinging motion while being held in the pedestrian's hand when the magnitude of the horizontal acceleration is equal to or greater than a second predetermined value, and determine that the portable terminal makes the swinging motion while being carried in the pedestrian's pocket when the magnitude of the horizontal acceleration is less than the second predetermined value.

5. The portable terminal as claimed in claim 1, wherein the controller, when determining that the portable terminal makes the swinging motion, is further configured to determine a pitch variation according to the swinging motion of the portable terminal, determine that the portable terminal makes the swinging motion while being held in the pedestrian's hand when the pitch variation is equal to or greater than a second predetermined value, and determine that the portable terminal makes the swinging motion while being carried in the pedestrian's pocket when the pitch variation is less than the second predetermined value.

6. The portable terminal as claimed in claim 1, wherein the controller, when determining that the portable terminal makes the swinging motion, is further configured to set weights of a magnitude of horizontal acceleration and a pitch variation according to the swinging motion of the portable terminal, determine that the portable terminal makes the swinging motion while being held in the pedestrian's hand when a sum of the weights is equal to or greater than a second predetermined value, and determine that the portable terminal makes the swinging motion while being carried in the pedestrian's pocket when the sum of the weights is less than the second predetermined value.

7. The portable terminal as claimed in claim 1, wherein the controller, when determining that the portable terminal does not make the swinging motion, is further configured to determine a magnitude of angular velocity of the portable terminal, determine that the portable terminal is carried on the pedestrian's waist when the magnitude of the angular velocity is equal to or greater than a second predetermined value, and determine that the portable terminal is held in the pedestrian's non-swinging hand when the magnitude of the angular velocity is less than the second predetermined value.

8. The portable terminal as claimed in claim 1, wherein the controller, when determining that the portable terminal does not make the swinging motion, is further configured to determine a variance of a magnitude of yaw rate of the portable terminal, determine that the portable terminal is carried on the pedestrian's waist when the variance of the magnitude of the yaw rate is equal to or greater than a second predetermined value, and determine that the portable terminal is held in the pedestrian's non-swinging hand when the variance of the magnitude of the yaw rate is less than the second predetermined value.

9. The portable terminal as claimed in claim 1, wherein the controller, when the determining that the portable terminal does not make the swinging motion, is further configured to determine a variance of yaw of the portable terminal, determine that the portable terminal is carried on the pedestrian's waist when the variance of the yaw is equal to or greater than a second predetermined value, and determine that the portable terminal is held in the pedestrian's non-swinging hand when the variance of the yaw is less than the second predetermined value.

10. The portable terminal as claimed in claim 1, wherein the controller, when determining that the portable terminal does not make the swinging motion, is further configured to set weights of a magnitude of angular velocity, a variance of a magnitude of yaw rate, and a variance of yaw of the portable terminal, determine that the portable terminal is carried on the pedestrian's waist when a sum of the weights is equal to or greater than a second predetermined value, and determine that the portable terminal is held in the pedestrian's non-swinging hand when the sum of the weights is less than the second predetermined value.

11. A step length estimation method comprising:
  detecting acceleration due to a movement of a portable terminal by using an accelerometer embedded in the portable terminal as a pedestrian carrying the portable terminal walks;
  detecting angular velocity due to the movement of the portable terminal by using a gyroscope embedded in the portable terminal as the pedestrian walks;
  determining a magnitude of a swinging motion of the portable terminal by using at least one of the detected acceleration and angular velocity;
  when the magnitude of the swinging motion is equal to or greater than a predetermined value, determining that the portable terminal makes the swinging motion;
  determining a carrying position of the portable terminal in or on the pedestrian's body by using at least one of the detected acceleration and angular velocity; and
  estimating the step length of the pedestrian according to the determined carrying position of the portable terminal.

12. The step length estimation method as claimed in claim 11, wherein determining the magnitude of the swinging motion comprises using at least one of a magnitude of the acceleration and a pitch variation.

13. The step length estimation method as claimed in claim 12, wherein, when the magnitude of the swinging motion is determined using the magnitude of the acceleration and the pitch variation, determining the magnitude of the swinging motion comprises setting weights of the magnitude of the acceleration and the pitch variation according to values preset for the magnitude of the acceleration and the pitch variation respectively, and determining the magnitude of the swinging motion by a sum of the weights.

14. The step length estimation method as claimed in claim 11, further comprising, when the portable terminal is determined to make the swinging motion:
  determining a magnitude of horizontal acceleration according to the swinging motion of the portable terminal;
  comparing the magnitude of the horizontal acceleration with a second predetermined value;
  when the magnitude of the horizontal acceleration is equal to or greater than the second predetermined value, determining that the portable terminal makes the swinging motion while being held in the pedestrian's hand; and
  when the magnitude of the horizontal acceleration is less than the second predetermined value, determining that the portable terminal makes the swinging motion while being carried in the pedestrian's pocket.

15. The step length estimation method as claimed in claim 11, further comprising, when the portable terminal is determined to make the swinging motion:
  determining a pitch variation according to the swinging motion of the portable terminal;
  comparing the pitch variation with a second predetermined value;
  when the pitch variation is equal to or greater than the second predetermined value, determining that the portable terminal makes the swinging motion while being held in the pedestrian's hand; and
  when the pitch variation is less than the second predetermined value, determining that the portable terminal makes the swinging motion while being carried in the pedestrian's pocket.

16. The step length estimation method as claimed in claim 11, further comprising, when the portable terminal is determined to make the swinging motion:
  determining a magnitude of horizontal acceleration and a pitch variation according to the swinging motion of the portable terminal;
  setting weights of the magnitude of the horizontal acceleration and the pitch variation;

comparing a sum of the weights with a second predetermined value;

when the sum of the weights is equal to or greater than the second predetermined value, determining that the portable terminal makes the swinging motion while being held in the pedestrian's hand; and when the sum of the weights is less than the second predetermined value, determining that the portable terminal makes the swinging motion while being carried in the pedestrian's pocket.

17. The step length estimation method as claimed in claim 11, further comprising, when the portable terminal is determined not to make the swinging motion:

determining a magnitude of angular velocity of the portable terminal;

comparing the magnitude of the angular velocity with a second predetermined value;

when the magnitude of the angular velocity is equal to or greater than the second predetermined value, determining that the portable terminal is carried on the pedestrian's waist; and when the magnitude of the angular velocity is less than the second predetermined value, determining that the portable terminal is held in the pedestrian's non-swinging hand.

18. The step length estimation method as claimed in claim 11, further comprising, when the portable terminal is determined not to make the swinging motion:

determining a variance of a magnitude of yaw rate of the portable terminal;

comparing the variance of the magnitude of the yaw rate with a second predetermined value;

when the variance of the magnitude of the yaw rate is equal to or greater than the second predetermined value, determining that the portable terminal is carried on the pedestrian's waist; and when the variance of the magnitude of the yaw rate is less than the second predetermined value, determining that the portable terminal is held in the pedestrian's non-swinging hand.

19. The step length estimation method as claimed in claim 11, further comprising, when the portable terminal is determined not to make the swinging motion:

determining a variance of yaw of the portable terminal;

comparing the variance of the yaw with a second predetermined value;

when the variance of the yaw is equal to or greater than the second predetermined value, determining that the portable terminal is carried on the pedestrian's waist; and when the variance of the yaw is less than the second predetermined value, determining that the portable terminal is held in the pedestrian's non-swinging hand.

20. The step length estimation method as claimed in claim 11, further comprising, when the portable terminal is determined not to make the swinging motion:

determining a magnitude of angular velocity, a variance of a magnitude of yaw rate, and a variance of yaw of the portable terminal;

setting weights of the magnitude of the angular velocity, the variance of the magnitude of the yaw rate, and the variance of the yaw;

comparing a sum of the weights with a second predetermined value;

when the sum of the weights is equal to or greater than the second predetermined value, determining that the portable terminal is carried on the pedestrian's waist; and when the sum of the weights is less than the second predetermined value, determining that the portable terminal is held in the pedestrian's non-swinging hand.

* * * * *